United States Patent
Liu et al.

(10) Patent No.: US 6,508,067 B2
(45) Date of Patent: Jan. 21, 2003

(54) METHOD FOR CHECKING THE REFRIGERANT-FLUID LEVEL OF A CLOSED LOOP VEHICLE AIR-CONDITIONING SYSTEM

(75) Inventors: Jin Ming Liu, Conflans S/Honorine (FR); Bruno Hamery, Paris (FR)

(73) Assignee: Valeo Climatisation, La Verriere (FR)

( * ) Notice: Subject to any disclaimer, the term of this patent is extended or adjusted under 35 U.S.C. 154(b) by 0 days.

(21) Appl. No.: 09/736,231

(22) Filed: Dec. 15, 2000

(65) Prior Publication Data

US 2001/0032473 A1 Oct. 25, 2001

(30) Foreign Application Priority Data

Dec. 17, 1999 (FR) .............................. 99 16009

(51) Int. Cl.[7] .............................. B60H 1/32; F25B 49/02
(52) U.S. Cl. ........................... 62/126; 62/129
(58) Field of Search ....................... 62/125, 126, 127, 62/129, 130, 208, 209

(56) References Cited

U.S. PATENT DOCUMENTS

| 4,102,150 A | | 7/1978 | Kountz | 62/209 |
|---|---|---|---|---|
| 4,667,480 A | | 5/1987 | Bessler | 62/180 |
| 4,783,970 A | | 11/1988 | Takahashi | 62/176.3 |
| 4,790,143 A | * | 12/1988 | Hanson | 62/126 |
| 4,909,043 A | | 3/1990 | Masauji et al. | 62/158 |
| 5,251,453 A | * | 10/1993 | Stanke et al. | 62/126 |
| 5,301,514 A | * | 4/1994 | Bessler | 62/129 X |
| 5,713,213 A | * | 2/1998 | Nobuta et al. | 62/129 X |
| 5,934,087 A | * | 8/1999 | Watanabe et al. | 62/126 |

FOREIGN PATENT DOCUMENTS

DE 19713197 10/1998

* cited by examiner

*Primary Examiner*—Harry B. Tanner
(74) *Attorney, Agent, or Firm*—Liniak, Berenato & White

(57) ABSTRACT

A signal value is derived that is representative of the cooling power produced by an air-conditioning evaporator, the signal value being derived from at least one temperature sensor placed in thermal contact with the evaporator, or downstream from it in the cooled airflow, and the signal value is compared with a reference value corresponding to a normal refrigerant-fluid level. A signal value below the reference value indicates a low level of refrigerant-fluid.

12 Claims, 1 Drawing Sheet

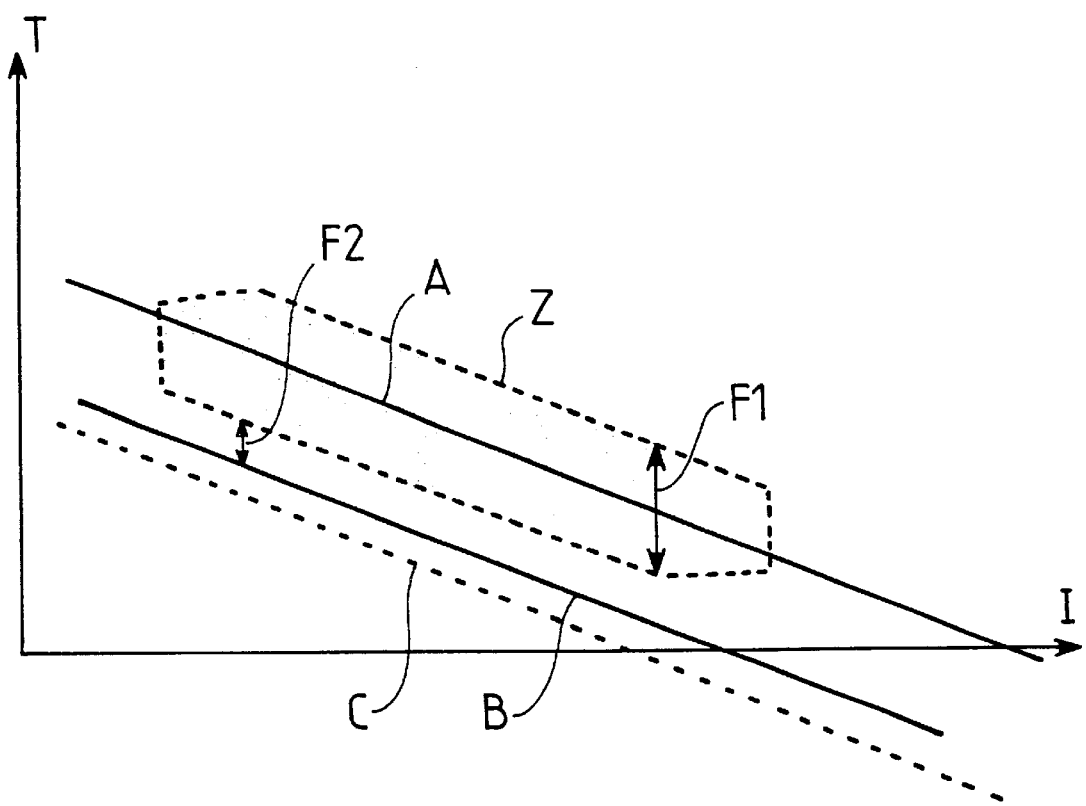

METHOD FOR CHECKING THE REFRIGERANT-FLUID LEVEL OF A CLOSED LOOP VEHICLE AIR-CONDITIONING SYSTEM

FIELD OF THE INVENTION

The invention relates to the air conditioning of the passenger compartment of motor vehicles.

BACKGROUND OF THE INVENTION

For this function, recourse is usually made to a system having a closed loop of refrigerant fluid, the system comprising a compressor, a condenser, a pressure-reduction valve and an evaporator, the latter being in contact with an airflow to be cooled.

Such a system is designed to operate correctly with a minimum quantity of refrigerant fluid. Below this minimum quantity, the evaporator is no longer supplied with sufficient fluid in the liquid state, and exhibits a substantially overheated area that does not allow adequate cooling of the airflow. A lack of refrigerant fluid can also lead to the compressor being damaged. This can come about especially in the event of leakage in the system.

The object of the invention is to allow detection of an insufficient refrigerant-fluid level, without having recourse to sensors provided specially for that purpose.

SUMMARY OF THE INVENTION

The invention envisages, in particular, a method for checking the refrigerant-fluid level of a closed loop air conditioning system for air conditioning the passenger compartment of a motor vehicle, the system including an evaporator suitable for cooling an airflow to be sent into the passenger compartment.

According to the invention, a signal value, representative of the cooling power produced by the evaporator, is derived from at least one temperature sensor placed in thermal contact with the evaporator or downstream from it in the said airflow, and the value of the signal is compared with a reference value corresponding to a normal refrigerant-fluid level, a value below the reference value indicating a low refrigerant-fluid level.

To derive the control signal, one or more existing sensors can be used, especially sensors serving to control the air conditioning as a function of cooling requirements or for preventing icing of the evaporator.

The method according to the invention can be implemented either during maintenance operations on the vehicle or while it is in use, a low level of refrigerant fluid then being signaled to the driver, for example by a lamp placed on the dashboard.

Optional characteristics of the invention, which are complementary or alternative, are set out below:

- to derive the signal value, at least one temperature sensor is used, placed in a mixing region between the evaporator and at least one air-outlet aperture into the passenger compartment;
- to derive the signal value, at least one temperature sensor is used, placed in the vicinity of an airflow-outlet aperture into the passenger compartment;
- to derive the said signal value, at least one temperature sensor is used, placed in a region of the passenger compartment swept by the said airflow;
- the temperature of the said airflow is measured upstream of the evaporator and the result is processed by means of a model of the operation of the air-conditioning apparatus in order to determine the said reference value;
- the temperature of the evaporator, or that of the said airflow in contact with the evaporator, is measured in the vicinity of the inlet for the refrigerant fluid into it, in order to determine the said reference value;
- when the air-conditioning system includes a compressor of the variable-throughput type controlled by an electrical control signal, the reference value is calculated from the control signal;
- the compressor is of the external-control, variable-displacement type, the control signal being a control current supplying a valve incorporated into the compressor and able to establish, at the inlet to it, a pressure which is determined by the said control current;
- the compressor is driven electrically;
- the representative signal value is derived when the compressor is operating at a sufficient throughput, in the case of a normal refrigerant-fluid level, to provide correct filling of the evaporator with fluid is in the liquid state;
- when the compressor is operating, the airflow leaving the evaporator is reheated so as to be sent into the passenger compartment at the desired temperature;
- the reference value corresponds to a temperature a few ° C., especially about 7° C., below a temperature varying as a linear function of the control signal, corresponding to the average value of the representative signal value observed in the normal refrigerant-fluid level case.

BRIEF DESCRIPTION OF THE DRAWINGS

The characteristics and advantages of the invention will be set out in more detail in the description below, by referring to the attached drawing.

The single FIGURE is a graph showing the variation in various temperature values as a function of the power-supply current of the control valve of an external-control, variable-displacement compressor.

DETAILED DESCRIPTION OF THE INVENTION

As indicated above, in the event of an under-filling of refrigerant fluid, the cooling power produced by the evaporator is reduced, all other things being equal. This results in a rise in average temperature both of the evaporator itself and of the air in contact with it, which has repercussions all along the path of the airflow downstream of the evaporator, within the air-conditioning apparatus, in the region of the outlets into the passenger compartment and in the passenger compartment itself. A signal representative of this cooling power can thus be derived from the signal from a single temperature sensor as well as from a combination of the signals from several existing temperature sensors.

The cooling power, characterized by the temperature of the air downstream of the evaporator, depends on various operating parameters of the air-conditioning apparatus, such as the pressure of the fluid upstream of the compressor and, if appropriate, on the displacement of the compressor, and the throughput of air, as well as on external conditions such as atmospheric relative humidity and temperature. In order to determine the reference level, it is therefore possible to measure the temperature of the airflow upstream of the evaporator and to process the result by means of a model of the operation of the apparatus taking the above parameters into account.

As long as a little refrigerant fluid remains in the air-conditioning system, the evaporator contains fluid in the liquid state in the immediate vicinity of its inlet. The temperature of the evaporator, or that of the airflow, at this spot, measured by an icing-detection probe, for example, therefore remains substantially normal despite a deficiency of fluid, and can be used to determine the reference level.

The invention can be applied especially in connection with a closed refrigerant-fluid loop air conditioning system comprising an external-control, variable-displacement compressor.

Such a compressor possesses a solenoid valve, preferably a chopper-type valve, the power-supply current of which determines the entry pressure of the fluid into the compressor. With this pressure being equal, to within a loss of pressure head, to that prevailing in the evaporator, which determines the operating temperature of the evaporator, it is thus possible to set the effectiveness of the air-conditioning loop with precision. An example of an external-control, variable-displacement compressor is described in EP-A-0 353 764.

In this case the control current, which determines the normal operating temperature of the evaporator, can serve as a basis for calculating the reference level.

In the FIGURE, the straight line A represents a typical relationship between the power-supply current I of the control valve of an external-control, variable-displacement compressor and the temperature T of the evaporator probe for given air-conditioning conditions (air throughput, upstream air temperature), and for a minimum refrigerant-fluid fill level in the loop. Depending on various external parameters, the actual average temperature of the evaporator, for a normal refrigerant-fluid fill level, may vary for example by ±4° C. with respect to the equilibrium temperature, as indicated by the double arrow F1, the corresponding representative point lying within the shaded area Z. As long as the temperature actually recorded lies within the region Z, it can therefore not be considered that the refrigerant-fluid fill level is abnormally low. A detection limit can be adopted, corresponding to the straight line B, situated at a distance of 3° C. (double arrow F2) below the region Z, i.e. at 7° C. below the straight line A. The dashed straight line C, situated below the straight line B, represents an example of variation of the actual temperature as a function of the control current, in the case of an under-full level of refrigerant fluid.

When the external-control compressor is operating at low throughput by reason of a low cooling demand, it is more difficult to bring to light an under-full level of refrigerant fluid in the loop. In order to enhance detection of any under-full level in these conditions, the invention then makes provision to have the compressor operate momentarily at high throughput, during the check. When the check is not being carried out in a workshop but while the vehicle is in use, it is then appropriate to reheat the airflow having passed through the evaporator, for example by having it pass in a known way in contact with a radiator supplied with the cooling fluid from the power plant of the vehicle, in order to ensure a comfortable temperature in the passenger compartment.

What is claimed is:

1. A method for checking the refrigerant-fluid level of a closed loop air conditioning system for air conditioning a passenger compartment of a motor vehicle, the system including an evaporator suitable for cooling an airflow to be sent into the passenger compartment, wherein a signal value is derived representative of the cooling power produced by the evaporator, from at least one temperature sensor placed in thermal contact with the evaporator or downstream from it in said airflow, and the signal value of said signal is compared with a reference value corresponding to a current corresponding to a normal refrigerant-fluid level, a signal value below the reference value indicating a low refrigerant-fluid level.

2. A method according to claim 1, wherein to derive said signal value at least one temperature sensor placed in a mixed region between the evaporator and at least one air-outlet aperture into the passenger compartment.

3. A method according to claim 1, wherein to derive the said signal value at least one temperature sensor is used placed in the vicinity of an airflow-outlet aperture into the passenger compartment.

4. A method according to claim 1, wherein to derive the said signal value at least one temperature sensor is used placed in a region of the passenger compartment swept by said airflow.

5. A method according to claim 1, wherein the temperature of said airflow is measured upstream of the evaporator and the result is processed by means of a model of the operation of the air-conditioning apparatus in order to determine the said reference level.

6. A method according to claim 1, wherein the temperature of the evaporator, or that of said airflow in contact with the evaporator, is measured in the vicinity of the inlet for the refrigerant fluid into it in order to determine the said reference value.

7. A method for checking the refrigerant-fluid level of a closed loop air conditioning system for air conditioning a passenger compartment of a motor vehicle, the system including an evaporator suitable for cooling an airflow to be sent into the passenger compartment, wherein a signal value is derived representative of the cooling power produced by the evaporator, from at least one temperature sensor placed in thermal contact with the evaporator or downstream from it in the said airflow, and the signal value of said signal is compared with a reference value corresponding to a normal refrigerant-fluid level, a signal value below the reference value indicating a low refrigerant-fluid level, wherein said closed loop air-conditioning system includes a compressor of the variable-throughput type controlled by an electrical control signal, and wherein said reference value is calculated from said control signal.

8. A method according to claim 7, wherein the compressor is of the external-control, variable-displacement type including a valve, said control signal being a control current supplying said valve, said compressor including pressure determining means operable to establish, at the inlet to said compressor, a pressure which is determined by the said control current.

9. A method according to claim 7, wherein the compressor is driven electrically.

10. A method according to claim 7, wherein said representative signal value is derived when the compressor is operating at a sufficient throughput, in the case of a normal fill level, to provide correct filling of the evaporator with fluid in the liquid state.

11. A method according to claim 10, wherein when said compressor is operating, the airflow leaving the evaporator is reheated so as to be sent into the passenger compartment at the desired temperature.

12. A method according to claim 7, wherein said reference value corresponds to a temperature which is a few ° C. lower than a temperature varying as a control signal linear function, which corresponds to the average value of said representative signal in a normal charge case.

* * * * *